US011605089B2

(12) United States Patent
Malik et al.

(10) Patent No.: US 11,605,089 B2
(45) Date of Patent: Mar. 14, 2023

(54) REMOTE DATA ACCESS USING A NETWORK-ENABLED FUEL DISPENSING SYSTEM

(71) Applicant: 7-Eleven, Inc., Irving, TX (US)

(72) Inventors: Vivek Malik, Farmers Branch, TX (US); Maninder Singh Suri, Irving, TX (US); Gurmeet Singh, Irving, TX (US); Matthew O'Daniel Redmond, Denton, TX (US); Boonchai Matthew Ragan, Lewisville, TX (US)

(73) Assignee: 7-ELEVEN, INC., Irving, TX (US)

( * ) Notice: Subject to any disclaimer, the term of this patent is extended or adjusted under 35 U.S.C. 154(b) by 0 days.

(21) Appl. No.: 16/408,222

(22) Filed: May 9, 2019

(65) Prior Publication Data

US 2020/0356993 A1 Nov. 12, 2020

(51) Int. Cl.
*G06Q 20/40* (2012.01)
*B67D 7/34* (2010.01)
(Continued)

(52) U.S. Cl.
CPC ........... *G06Q 20/409* (2013.01); *B67D 7/348* (2013.01); *G06Q 20/3829* (2013.01);
(Continued)

(58) Field of Classification Search
CPC ........... G06Q 20/409; G06Q 20/38215; G06Q 50/06; B67D 7/348
See application file for complete search history.

(56) References Cited

U.S. PATENT DOCUMENTS 4,405,829 A * 9/1983 Rivest ..................... H04L 9/302
380/255
4,882,779 A * 11/1989 Rahtgen ..................... G07F 7/10
705/72
(Continued)

OTHER PUBLICATIONS

"RSA Encryption and Diffie Hellman Key Exchange" by Mira Scarvalone, dated Jul. 17, 2009 https://math.uchicago.edu/~may/VIGRE/VIGRE2009/REUPapers/Scarvalone.pdf (hereinafter "Scarvalone") (Year: 2009).*

(Continued)

*Primary Examiner* — Bennett M Sigmond
*Assistant Examiner* — Raven E Zeer
(74) *Attorney, Agent, or Firm* — Baker Botts L.L.P.

(57) ABSTRACT

A system that includes a fuel dispenser terminal and a remote controller. The fuel dispenser terminal is configured to generate a service request for a fuel purchase that includes card information, encrypt the service request, and send the encrypted service request to the remote controller. The fuel dispenser terminal is further configured to receive a personalized offer in response to sending the encrypted service request and display the personalized offer. The remote controller is configured to decrypt the service request to identify the card information associated with a customer and determine an identity of the customer based on the card information. The remote controller is further configured to generate a personalized offer for the customer based on their identity and send the personalized offer to the fuel dispenser terminal. The remote controller is further configured to re-encrypt the service request and send the re-encrypted service request to a service processor.

20 Claims, 4 Drawing Sheets

(51) Int. Cl.
*G06Q 50/06* (2012.01)
*G06Q 20/38* (2012.01)
*H04L 9/08* (2006.01)
*G06Q 30/02* (2012.01)
*H04L 9/00* (2022.01)
*G06Q 30/0251* (2023.01)

(52) U.S. Cl.
CPC ... *G06Q 20/38215* (2013.01); *G06Q 30/0271* (2013.01); *G06Q 50/06* (2013.01); *H04L 9/0822* (2013.01); *H04L 9/006* (2013.01)

(56) References Cited

U.S. PATENT DOCUMENTS

| | | | | |
|---|---|---|---|---|
| 5,842,188 | A * | 11/1998 | Ramsey | G07F 13/025 705/416 |
| 5,980,090 | A * | 11/1999 | Royal, Jr. | G07F 13/025 700/218 |
| 6,321,984 | B1 * | 11/2001 | McCall | G07F 13/025 235/380 |
| 6,947,908 | B1 * | 9/2005 | Slater | G06Q 20/12 705/50 |
| 2005/0147250 | A1 * | 7/2005 | Tang | G06Q 20/20 380/259 |
| 2006/0095318 | A1 * | 5/2006 | Ross | G06Q 30/0224 705/14.27 |
| 2006/0271431 | A1 * | 11/2006 | Wehr | G06Q 30/0226 705/14.65 |
| 2011/0282727 | A1 * | 11/2011 | Phan | G06Q 30/0241 705/14.1 |
| 2013/0246171 | A1 * | 9/2013 | Carapelli | G06Q 20/325 705/14.51 |
| 2014/0081874 | A1 * | 3/2014 | Lewis | G07F 19/202 705/72 |
| 2014/0181995 | A1 * | 6/2014 | Smith | G06Q 30/00 726/28 |
| 2015/0106196 | A1 * | 4/2015 | Williams | G06Q 20/326 705/14.51 |
| 2016/0155109 | A1 * | 6/2016 | Tang | G06Q 20/327 705/71 |
| 2017/0076274 | A1 * | 3/2017 | Royyuru | G06Q 20/18 |
| 2017/0171178 | A1 * | 6/2017 | Reynders | G06Q 20/145 |
| 2019/0244205 | A1 * | 8/2019 | Fieglein | G06Q 20/3229 |
| 2019/0370858 | A1 * | 12/2019 | Bennett | G06Q 20/3224 |
| 2020/0175803 | A1 * | 6/2020 | Derby | G06Q 20/145 |

OTHER PUBLICATIONS

Malik, V. et al., "Network-Enabled Fuel Dispensing System," U.S. Appl. No. 16/408,251, filed May 9, 2019, 35 pages.

\* cited by examiner

REMOTE DATA ACCESS USING A NETWORK-ENABLED FUEL DISPENSING SYSTEM

TECHNICAL FIELD

The present disclosure relates generally to fuel dispenser terminals, and more specifically to information access control using a network-enabled fuel dispensing system.

BACKGROUND

Conventional fuel dispenser terminals are typically only configured to facilitate dispensing fuel to a customer. These terminals are ill-equipped to send and receive information to perform other operations. For example, these terminals are not network-enabled (e.g. connected to the Internet) devices and lack the capability to make information requests to remote data sources. Relying on information stored locally in a fuel dispenser terminal is not a viable solution because this requires manually maintaining and updating the information stored in each fuel dispenser terminal. This inability to access information from remote data sources limits the overall functionality of conventional fuel dispenser terminals.

SUMMARY

Conventional fuel dispenser terminals are typically only configured to facilitate dispensing fuel to a customer. These terminals are ill-equipped to send and receive information to perform other operations. For example, these terminals are not network-enabled (e.g. connected to the Internet) devices and lack the capability to make information requests to remote data sources. Relying on information stored locally in a fuel dispenser terminal is not a viable solution because this requires manually maintaining and updating the information stored in each fuel dispenser terminal. This inability to access information from remote data sources limits the overall functionality of conventional fuel dispenser terminals. Thus, it is desirable to provide the ability to access information from remote data sources to increase the functionality of existing fuel dispenser terminals.

The system described in the present application provides a technical solution to the technical problems discussed above by employing an architecture that enables and utilizes network connectivity for fuel dispenser terminals. The disclosed system provides several practical applications and technical advantages which include 1) converting fuel dispenser terminals into network-enabled fuel dispenser terminals and 2) providing the ability to securely exchange information between fuel dispenser terminals and remote data sources.

In one embodiment, a network-enabled fuel dispensing system comprises a fuel dispenser terminal that is configured to exchange information with a remote controller. The fuel dispenser terminal and the remote controller are located at different locations. The fuel dispenser terminal is configured to generate a service request that includes card information associated with a customer. The service request is used by the fuel dispenser terminal to request a fuel purchase for the customer. The fuel dispenser terminal encrypts the service request and sends the encrypted service request to the remote controller. The remote controller decrypts the service request to identify the card information associated with the customer. The remote controller uses the card information to determine the identity of the customer and to generate a personalized offer for the customer based on their identity. The remote controller sends the personalized offer to the fuel dispenser terminal. The fuel dispenser terminal receives the personalized offer and displays the personalized offer for the customer. The remote controller also re-encrypts the service request and sends the encrypted service request to a service processor for authorization to dispense fuel to the customer.

In one embodiment, the fuel dispenser terminal is configured to present a personalized offer to a customer and to receive a user response that indicates that the personalized offer was accepted. For example, the user response may indicate that the customer accepts a coupon for a product that's available at a store where the fuel dispenser terminal is located. The fuel dispenser terminal sends the user response to the remote controller to accept the personalized offer. The remote controller receives the user response and determines that the personalized offer was accepted. The remote controller updates the service request by adding a purchase of the product associated with the personalized offer to a fuel purchase in a service request. The remote controller encrypts the updated service request and sends the encrypted service request to the service processor. The remote controller receives an authorization confirmation in response to sending the encrypted service request to the service processor. In response to receiving the authorization confirmation, the remote controller generates an authorization token for retrieving the product and sends the authorization token to the fuel dispenser terminal.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system described in the present application provides a technical solution to the technical problems discussed above by employing an architecture that enables and utilizes network connectivity for fuel dispenser terminals. The disclosed system provides several practical applications and technical advantages which include 1) converting fuel dispenser terminals into network-enabled fuel dispenser terminals and 2) providing the ability to securely exchange information between fuel dispenser terminals and remote data sources.

In one embodiment, a network-enabled fuel dispensing system comprises a fuel dispenser terminal that is configured to exchange information with a remote controller. The fuel dispenser terminal and the remote controller are located at different locations. The fuel dispenser terminal is configured to generate a service request that includes card information (e.g. a card number) associated with a customer. The service request is used by the fuel dispenser terminal to request a fuel purchase for the customer. For example, a customer may request a fuel purchase by providing their card information to the fuel dispenser terminal by swiping or inserting their card into the fuel dispenser terminal. The fuel dispenser terminal encrypts the service request and sends the encrypted service request to the remote controller. The remote controller decrypts the service request to identify the card information associated with the customer. The remote controller uses the card information to determine the identity of the customer and to generate a personalized offer for the customer based on their identity.

Conventional fuel dispensing systems use end-to-end encryption for information that is transmitted between a fuel dispenser terminal and a service processor. In these systems, the identity of the customer is unknown unless the customer provides an alternative identifier such as a loyalty card number. This means that conventional systems are unable to provide personalized offers and information for a customer because the identity of the customer is typically unknown. In contrast, the network-enabled fuel dispensing system is configured to decrypt the service request before sending the service request to the service processor. This allows the remote controller to identify the customer based on their card information regardless of whether the customer provides any alternative identifiers. The network-enabled fuel dispensing system is able to track other purchases and transactions for the user based on their card information. This allows the remote controller to identify offers for products and services that are relevant to the customer based on the previous transaction history associated with the customer's card information. The remote controller sends the personalized offer to the fuel dispenser terminal to present to the customer. The fuel dispenser terminal receives the personalized offer and displays the personalized offer for the customer. For example, the fuel dispenser terminal may display an advertisement or a coupon for product on a graphical user interface of the fuel dispenser terminal. The remote controller also re-encrypts the service request and sends the encrypted service request to a service processor for authorization to dispense fuel to the customer.

In one embodiment, the fuel dispenser terminal is configured to receive a user response that indicates that a personalized offer was accepted. For example, the user response may indicate that the customer accepts a coupon for a product that's available at a store where the fuel dispenser terminal is located. The fuel dispenser terminal sends the user response to the remote controller to accept the personalized offer. The remote controller receives the user response and determines that the personalized offer was accepted. The remote controller updates the service request by adding a purchase of the product associated with the personalized offer to a fuel purchase in the service request. As discussed above, conventional fuel dispensing systems typically use end-to-end encryption for information that is transmitted between the fuel dispenser terminal and the service processor. This means that these systems are unable to modify or add additional purchases to requests that are sent to the service processor. In contrast, the network-enabled fuel dispensing system is able to modify an existing service request before the remote controller sends the service request to the service processor. This means that the remote controller can modify and add additional purchases to the original service request before sending the service request to the service processor for processing. The remote controller encrypts the updated service request and sends the encrypted service request to the service processor. The remote controller receives an authorization confirmation in response to sending the encrypted service request to the service processor. The authorization confirmation indicates that the customer has been approved for the requested purchases based on their card information. In response to receiving the authorization confirmation, the remote controller generates an authorization token for retrieving the product and sends the authorization token to the fuel dispenser terminal.

Figure 1:
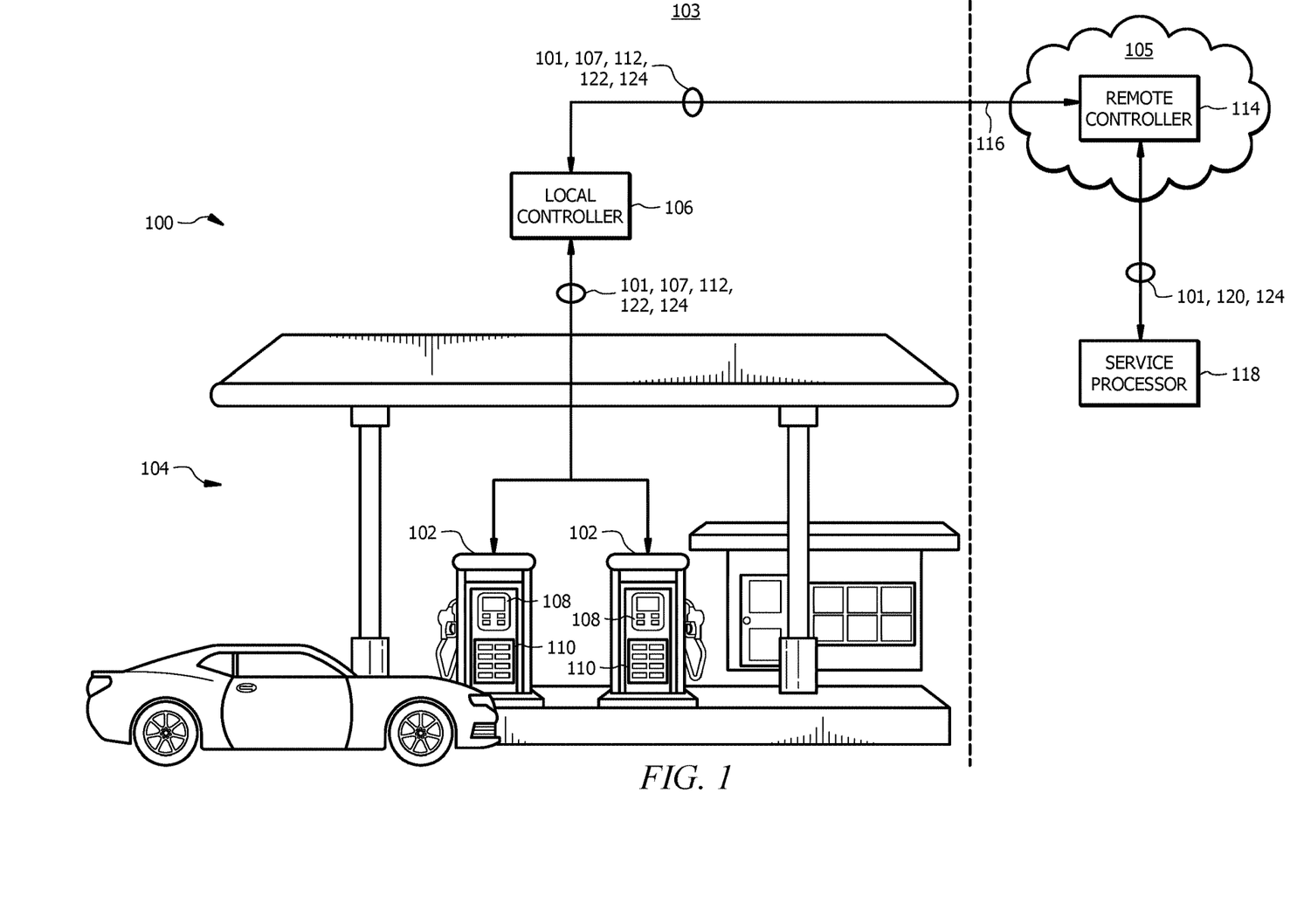
FIG. 1 is a schematic diagram of an embodiment of a network-enabled fuel dispensing system.
Figure 2A:
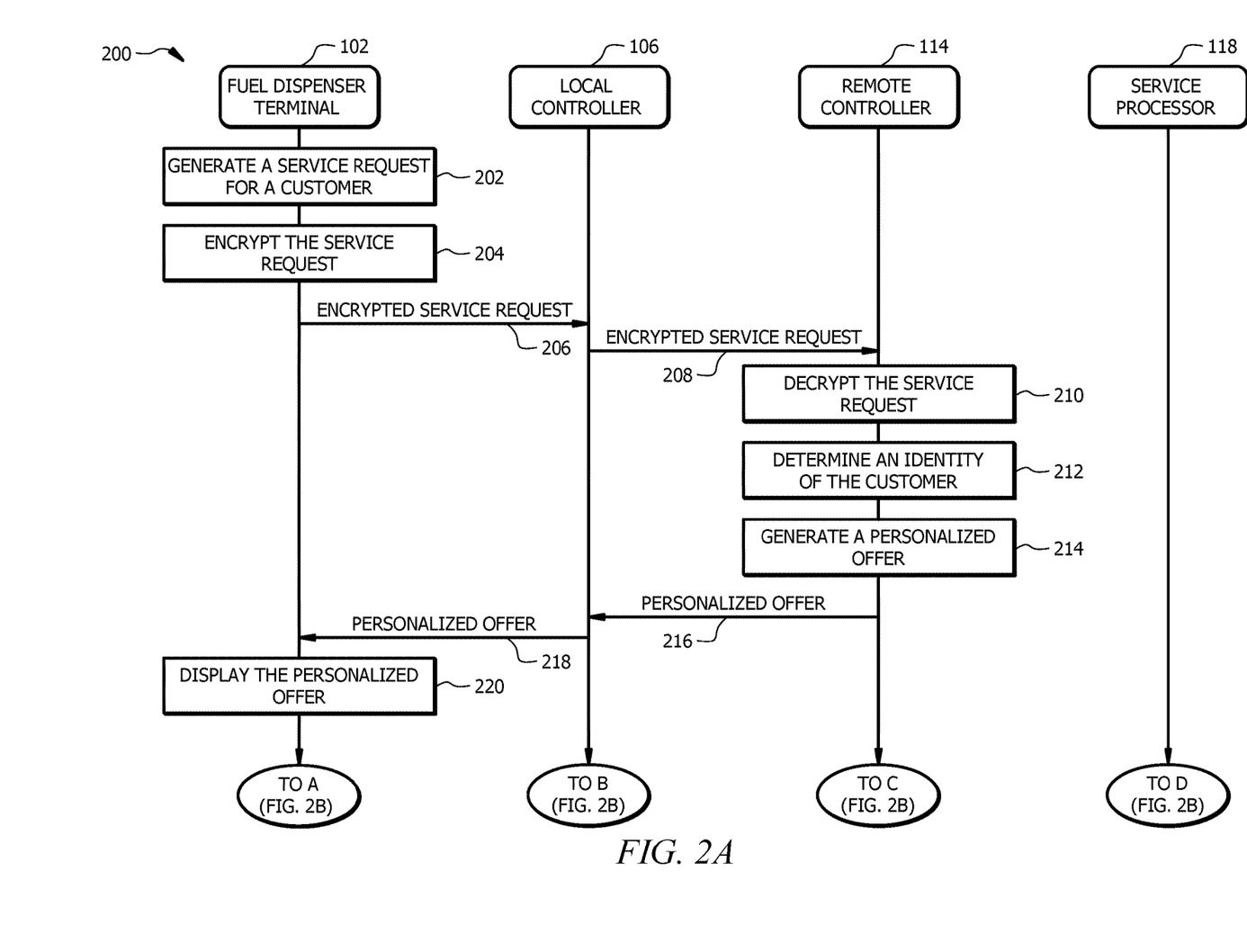
FIG. 2A is an embodiment of a first portion of an information control method for a network-enabled fuel dispensing system.
Figure 2B:
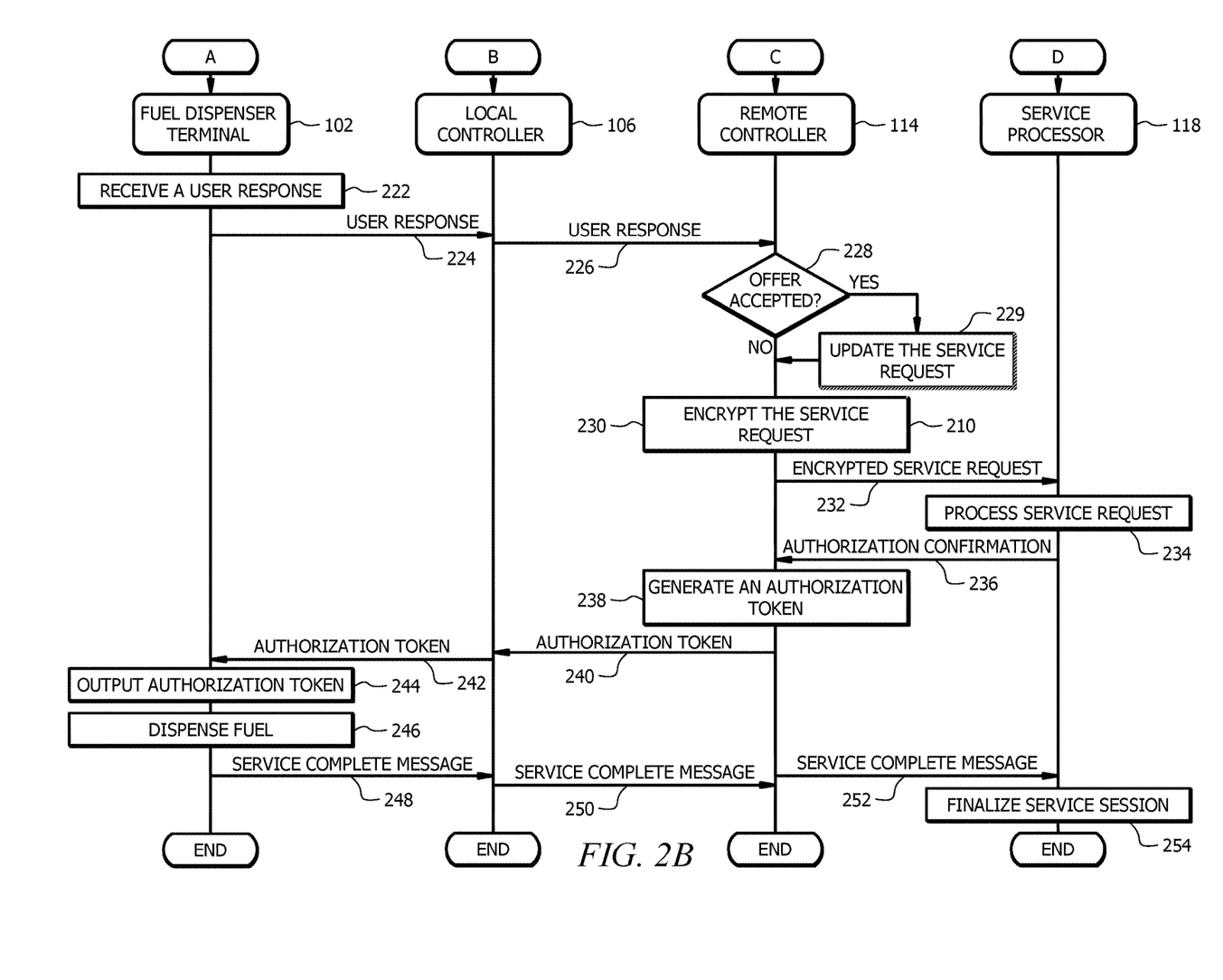
FIG. 2B is an embodiment of a second portion of the information control method for the network-enabled fuel dispensing system.
Figure 3:
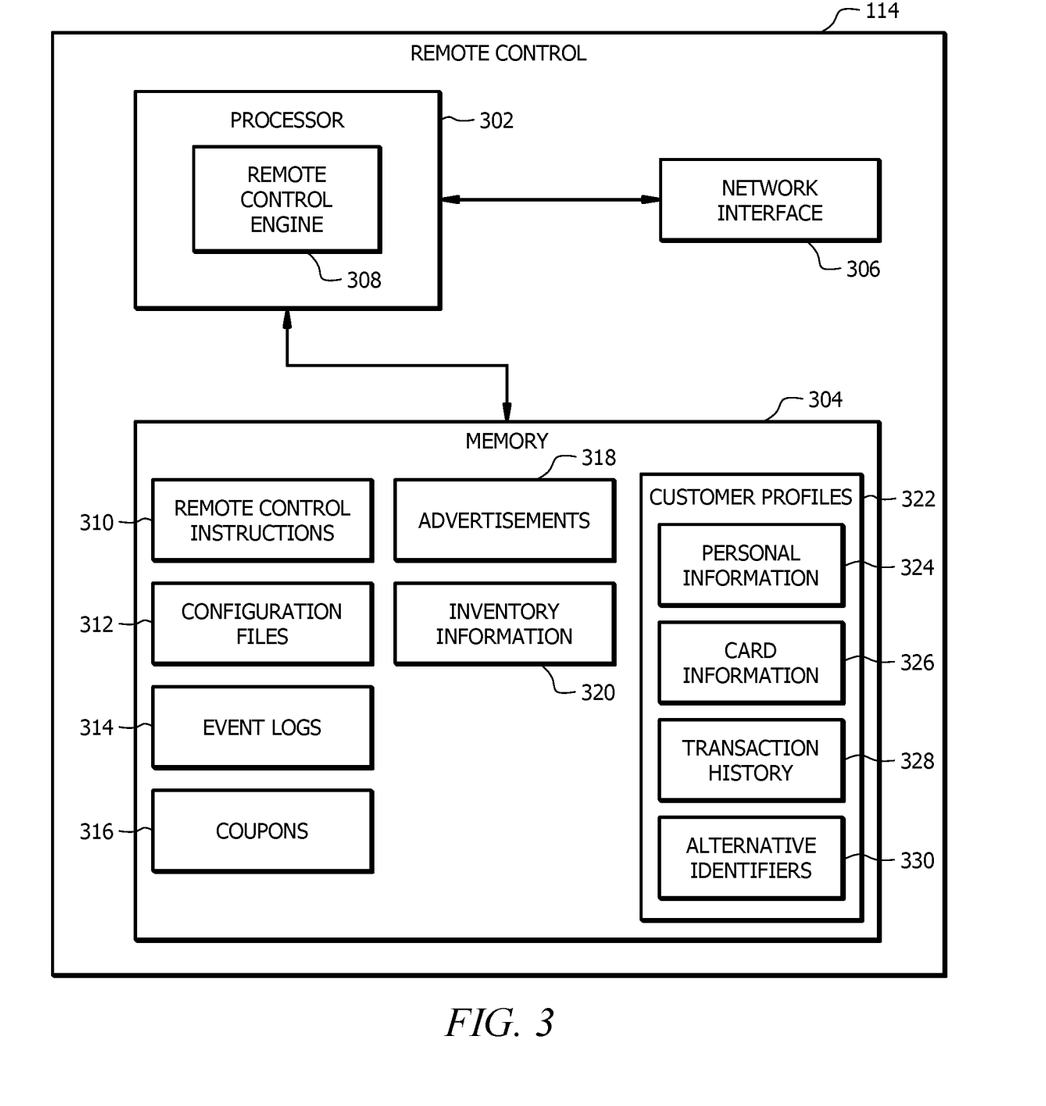
FIG. 3 is a schematic diagram of an embodiment of a remote controller for the network-enabled fuel dispensing system.

FIG. 1 is an example of a network-enabled fuel dispensing system. FIGS. 2A and 2B combine to provide an example of an information control method for the network-enabled fuel dispensing system. FIG. 3 is an example of a device configured implement a remote controller for the network-enabled fuel dispensing system.

Network-Enabled Fuel Dispensing System Architecture

FIG. 1 is a schematic diagram of an embodiment of a network-enabled fuel dispensing system 100. In one embodiment, the network-enabled fuel dispensing system 100 comprises one or more fuel dispenser terminals 102, a local controller 106, and a remote controller 114. The network-enabled fuel dispensing system 100 may be configured as shown in FIG. 1 or in any other suitable configuration.

Fuel Dispenser Terminals

The fuel dispenser terminals 102 are located at a first location 103. For example, the fuel dispenser terminals 102 may be located on the property of a gas station or a convenience store 104. The fuel dispenser terminals 102 are configured to dispense fuel to a customer and to communicate information between the customer and the remote controller 114. An example of the fuel dispenser terminal 102 in operation is described in FIGS. 2A-2B.

A fuel dispenser terminal 102 comprises a fuel dispensing system 110 operably coupled to a user interface 108. The fuel dispensing system 110 may comprise hydraulics, pumps, motors, piping, a ventilation system, switches, electronics, any other suitable components, or combination of components, as would be appreciated by one of ordinary skill in the art. The fuel dispensing system 110 is configured to control how fuel is dispensed to a customer based on control signals from the user interface 108. For example, the fuel dispensing system 110 may be configured to receive a first control signal that triggers the fuel dispensing system 110 to initiate a flow of fuel to a customer and a second control signal that triggers the fuel dispensing system 110 to terminate the flow of fuel to the customer. The fuel dispensing system 110 may be configured to implement any suitable protocol for dispensing fuel as would be appreciated by one of ordinary skill in the art.

The user interface 108 is configured to send control signals to the fuel dispensing system 110 to control how fuel is dispensed to a customer. For example, the user interface 108 may be configured to send a service request 101 to request a fuel purchase for the customer. For example, a customer may request a fuel purchase by providing their card information to the fuel dispenser terminal 102 by swiping or inserting their card into the fuel dispenser terminal 102. In response to sending a service request 101, the customer will receive an authorization token 122 that indicates the customer has been approved for a fuel purchase. In other words, receiving an authorization token 122 indicates that the fuel dispenser terminal 102 is authorized to dispense fuel to the customer. The user interface 108 is further configured to send control signals to the fuel dispensing system 110 to control flow of fuel to the customer in response to receiving the authentication token 122. The user interface 108 is in signal communication with the fuel dispensing system 110 using any suitable type of wired or wireless connection as would be appreciated by one of ordinary skill in the art. In some embodiments, the authorization token 122 may also be used to retrieve other products and services purchased by the customer. For example, the fuel dispenser terminal 102 may receive an authorization token 122 that allows the customer to retrieve a product from a store 104 at the first location 103 in response to the customer accepting an offer for the product.

The user interface 108 is further configured to exchange information between a customer and the remote controller 114 via the local controller 106. The user interface 108 is in signal communication with the local controller 106 using any suitable type of wired or wireless connection as would be appreciated by one of ordinary skill in the art. For example, the user interface 108 and the local controller 106 may be in signal communication with each other using an Ethernet cable or WiFi connection. The user interface 108 is configured to send a service request 101 to the remote controller 114 to request information and to present the requested information to the customer. The user interface 108 may comprise a display, speakers, a printer, buttons, switches, keypads, touchscreens, touchpads, card readers, microphones, camera, a network interface, or any other suitable type of hardware as would be appreciated by one of ordinary skill in the art.

Local Controller

The local controller 106 is also located at the first location 103. The local controller 106 may be any suitable network device or server (e.g. a client or proxy server) configured to communicate data between the fuel dispenser terminals 102 and the remote controller 114. The local controller 106 may be formed by one or more physical devices configured to provide services and resources (e.g. data and/or hardware resources) for the fuel terminal devices 102 located at the first location 103. For example, the local controller 106 may be a proxy server that acts as an intermediary for exchanging data between fuel dispenser terminals 102 and the remote controller 114. An example of the local controller 106 in operation is described in FIGS. 2A-2B. The local controller 106 and the remote controller 114 may be in signal communication with each other over a network connection 116. The network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art upon viewing this disclosure.

Remote Controller

The remote controller 114 is located at a second location 105 that is remote (e.g. geographically different) from the first location 103. The remote controller 114 may be any suitable network device or server as would be appreciated by one of ordinary skill in the art. For example, the remote controller 114 may be a server located in a remote server farm or data center. The remote controller 114 may be formed by one or more physical devices configured to provide services and resources (e.g. data and/or hardware resources) for the network-enabled fuel dispensing system 100. For example, the remote controller 114 may be a proxy server that acts as an intermediary for exchanging data between local controller 106 and the service processor 118. Additional information about the remote controller 114 is described in FIG. 3. An example of the remote controller 114 in operation is described in FIGS. 2A-2B.

The remote controller 114 is configured to provide instructions for operating and maintaining the fuel dispenser terminals 102. For example, the remote controller 114 may be configured to store and upload configuration files 312 to the fuel dispenser terminals 102. Configuration files 312 comprise instructions for configuring the hardware and/or software of a fuel dispenser terminal 102. Examples of configuration files 312 include, but are not limited to, firmware updates, BIOS updates, and software updates. The remote controller 114 may be configured to upload configuration files 312 to one or more fuel dispenser terminals 102 periodically or on-demand.

As another example, the remote controller 114 may be configured to download and store event logs 314 from the fuel dispenser terminals 102. Event logs 314 comprise information about the operation history of the fuel dispenser terminals 102. For instance, event logs 314 may comprise information about a quantity of fuel dispensed, timestamps for transactions made by the fuel dispenser terminals 102, or any other type of information associated with the fuel dispenser terminals 102. The remote controller 114 may be configured to periodically request and/or receive event log information. For instance, the remote controller 114 may be configured to receive event log information every thirty seconds, every minute, every thirty minutes, every hour, or at any suitable time interval.

The remote controller 114 is further configured to exchange information with the fuel dispenser terminals 102. Conventional fuel dispensing systems use end-to-end encryption for information that is transmitted between a fuel dispenser terminal 102 and a service processor 118. In these systems, devices between the fuel dispenser terminal 102 and the service processor 118 are unable to access or view information that is transmitted between the fuel dispenser terminal 102 and the service processor 118. In addition, the identity of the customer is unknown unless the customer provides an alternative identifier such as a loyalty card number. This means that conventional systems are unable to provide personalized information and offers for a customer because the identity of the customer is typically unknown.

In contrast, the remote controller 114 is configured to decrypt the service request 101 to determine the identity of a customer before sending the service request 101 to the service processor 118. For example, the remote controller 114 may be configured to receive an encrypted service request 101 that comprises card information (e.g. a card number) associated with a customer from a fuel dispenser terminal 102. The service request 101 is sent by the fuel dispenser terminal 102 to request a fuel purchase for the customer. The remote controller 114 is configured to decrypt the service request 101 and to identify the card information associated with the customer in the service request 101. The remote controller 114 is configured to use the card information to determine the identity of the customer. This means that the remote controller 114 can identify the customer based on their card information regardless of whether the customer provides any alternative identifiers. For example, the remote controller 114 may use the card information to identify a customer profile 322 associated with the customer.

In this example, customer profiles 322 comprise card information associated with different customers. The remote controller 114 may use the card information (e.g. a card number) from the service request 101 to search for customer profiles 322 that contain matching card information. The customer profile 322 may further comprise other information associated with a customer. For example, a customer profile 322 may comprise personal information 324, card information 326, transaction history information 328, alternative identifiers 330 (e.g. loyalty card identifiers), or any other suitable type of information associated with a customer.

The remote controller 114 may also track other purchases and transactions for the customer based on their card information. This allows the remote controller 114 to identify offers for products and services that are relevant to the customer based on the previous transaction history associated with the customer's card information. The fuel dispenser terminal 102 may use the service request 101 to request personalized information or offers for the customer. For example, the remote controller 114 may generate a personalized offer 107 that includes a coupon 316 for a product for the customer based on their transaction history information 328. Other examples of personalized offers 107 and information include, but are not limited to, vouchers or coupons 316 for products, an advertisement 318, product information, news information, or any other suitable type of information. The remote controller 114 generates the personalized offer 107 for the customer and sends the personalized offer 107 back to the fuel dispenser terminal 102.

In one embodiment, the remote controller 114 is configured to receive a user response 112 from the fuel dispenser terminal 102 in response to sending a personalized offer 107 (e.g. a coupon 316 for a product) to the fuel dispenser terminal 102. The user response 112 indicates that the personalized offer 107 was accepted. In response to determining that the personalized offer 107 was accepted, the remote controller 114 may update the service request 101 by adding a purchase of a product to a fuel purchase in the service request 101. As discussed above, conventional fuel dispensing systems typically used end-to-end encryption for information that is transmitted between the fuel dispenser terminal 102 and the service processor 118. This means that these systems are unable to modify or add additional purchases to requests that are sent to the service processor 118. In contrast, the remote controller 114 is able to modify an existing purchase request before the remote controller 114 sends the service request 101 to the service processor 118.

The remote controller is further configured to re-encrypt the service request 101 and send the service request 101 to the service processor 118 to request authorization for dispensing fuel. Once the service request 101 has been processed, the remote controller 114 is configured to receive an authorization confirmation 120 from the service processor 118, to generate an authorization token 122 in response to receiving the authorization confirmation 120, and to send the authorization token 122 to the fuel dispenser terminal 102. The authorization token 122 is used to indicate to the fuel dispenser terminal 102 that the fuel dispenser terminal 102 is authorized to begin dispensing fuel to the customer. In some embodiments, the authorization token 122 may also be used for retrieving a product or service for an accepted personalized offer 107. For example, the fuel dispenser terminal 102 may print a representation of the authorization token 122 which may be used by the customer to retrieve a product or service from the first location 103. Once the fuel dispenser terminal 102 has completed dispensing fuel to the customer, the remote controller 114 is configured to send a service complete message 124 to the service processor 118 to finalize the fuel purchase and any other purchases.

Service Processor

In one embodiment, the service processor 118 is configured to authorize a customer for a purchase and to facilitate the transaction from the customer's account. For example, the service processor 118 may be configured to authorize a fuel purchase based on card information for a customer, to send an authorization confirmation, and to process a transaction for the fuel purchase when the fuel dispenser terminal 102 is finished providing fuel to the customer. The service processor 118 may be configured to process payments using credit cards, debit cards, gift cards, or any suitable type of card payment. In some embodiments, the service processor 118 may be associated with a third-party such as a financial institute, banking facilities, or a credit card company.

Information Control Process for the Network-Enabled Fuel Dispensing System

FIGS. 2A and 2B combine to describe an embodiment of an information control method 200 for a network-enabled fuel dispensing system 100. Method 200 may be employed by the network-enabled fuel dispensing system 100 to facilitate the flow of communication between a fuel dispenser terminal 102 and the remote controller 114. As an example, a customer may interact with the fuel dispenser terminal 102 to request fueling purchase and other personalized offers 107.

Referring to FIG. 2A, at step 202, the fuel dispenser terminal 102 generates a service request 101 comprising card information for a customer. The service request 101 is used to request a fuel purchase for the customer. For example, a customer may interact with the user interface 108 of the fuel dispenser terminal 102 to provide card information by inserting or swiping a payment card. The service request 101 may comprise a card number (e.g. a primary account number (PAN)) for a credit card, a debit card, a gift card, or any other suitable type of payment card. In some embodiments, the service request 101 may further comprise a card holder name, a security code, an expiration date, a zip code, any other suitable type of information associated with a payment card. The fuel dispenser terminal 102 may obtain the card information from the customer and use the card information to generate a service request 101. The service request 101 may be any suitable type of message and format as would be appreciated by one of ordinary skill in the art.

At step 204, the fuel dispenser terminal 102 encrypts the service request 101. The fuel dispenser terminal 102 may employ any suitable type of tokenization or encryption technique for encrypting the service request 101 as would be appreciated by one of ordinary skill in the art. Examples of encryption techniques include, but are not limited to, Pretty Good Privacy (PGP), Secure Shell (SSH), Secure Socket Layer (SSL), and Transport Layer Security (TLS). For example, the fuel dispenser terminal 102 may apply an SSH public encryption key to the service request 101 to generate an encrypted service request 101. At step 206, the fuel dispenser terminal 102 sends the encrypted service request 101 to the remote controller 114 via the local controller 106. At step 208, the local controller 106 receives the encrypted service request 101 and sends the encrypted service request 101 to the remote controller 114.

At step 210, the remote controller 114 receives the encrypted service request 101 and decrypts the encrypted service request 101. The remote controller 114 may employ any suitable type of detokenization or decryption technique to decrypt the encrypted service request 101 as would be appreciated by one of ordinary skill in the art. Examples of decryption techniques include, but are not limited to, PGP, SSH, SSL, and TSL. For example, the remote controller 114 may apply an SSH private encryption key to the encrypted service request 101 to decrypt the service request 101. Once the service request 101 is decrypted, the remote controller 114 is able to extract the card information from the service request 101. The remote controller 114 may also extract any other information provided by the fuel dispenser terminal 102 in the service request 101.

At step 212, the remote controller 114 determines an identity of the customer based on the card information associated with the customer in the decrypted service request 101. As an example, the remote controller 114 may use card information (e.g. a card number) from the service request 101 to identify a corresponding customer profile 322 that includes matching card information. For instance, the remote controller 114 may use the card number as a search token to identify a customer profile 322 that also contains the same card number. In this example, the remote controller 114 uses card information to identify a customer. This means that the customer does not need to provide an alternative identifier (e.g. a loyalty card) to be identified. The customer profile 322 is uniquely linked with the customer and provides information about the identity of the customer.

At step 214, the remote controller 114 generates a personalized offer 107 for the customer based on the identity of the customer. In one embodiment, the personalized offer 107 comprises one or more coupons 316. For example, the remote controller 114 may select a coupon 316 for the customer based on information in the customer's customer profile 322. The coupon 316 may be associated with products that are available at the first location 103 where the fuel dispenser terminal 102 is located. The coupon 316 may be for a discounted or complementary product (e.g. food or beverage) or service. As an example, the remote controller 114 may use inventory information 320 to identify products and services that are available at the first location 103. The inventory information 320 may comprise product information, pricing information, stock availability information, and/or any other suitable type of information about the products and services available at the first location 103. The remote controller 114 may also identify transaction history information 328 for the customer from their customer profile 322. The transaction history information 328 comprises information about products that the customer has previously purchased. In this example, the remote controller 114 may identify a product previously purchased by the customer based on their transaction history information 328 and select a coupon 316 for the identified, similar, or complementary product. For example, the remote controller 114 may access the customer's transaction history information 328 to identify products that the customer has previously purchased and may select a coupon 316 for a drink that the customer has previously purchased. As another example, the remote controller 114 may select a coupon 316 for a drink from the same brand that the customer has previously purchased. As another example, the remote controller 114 may select a coupon 316 for a food item (e.g. pizza) that complements a drink the customer has previously purchased. In other examples, the remote controller 114 may use any other information or combination of information from the customer's customer profile 322 to select a coupon 316 for the customer.

In one embodiment, some coupons 316 may only be available or offered on certain days or within certain time windows. For example, some coupons 316 may only be offered on the weekend, in the morning, or after work hours. Here, the remote controller 114 determines a timestamp for when the service request 101 was received by the remote controller 114 and selects a coupon 316 based at least in part on the timestamp. For instance, the remote controller 114 may determine that the service request 101 was received before 8:00 am, after 5:00 pm, during the week, or on the weekend based on a timestamp associated with when the service request 101 was received. In this example, the remote controller 114 may select the coupon 316 based at least in part on the date and/or time when the service request 101 was received. As an example, the remote controller 114 may determine that the service request 101 was received in the morning and may select a coupon for a breakfast product (e.g. coffee) that the customer has previously purchased.

In one embodiment, the personalized offer 107 may comprise one or more advertisements 318. The remote controller 114 may select one or more advertisements 318 for the customer based on information in their customer profile 322 and/or a timestamp for when the transaction information 101 was received. For example, the remote controller 114 may access the customer's transaction history information 328 to identify products that the customer has previously purchased and may select an advertisement related to the identified product. In other embodiments, the remote controller 114 may select any other suitable type of information for the customer. The remote controller 114 compiles the selected information to generate the personalized offer 107 for the customer.

At step 216, the remote controller 114 sends the personalized offer 107 to the fuel dispenser terminal 102 via the local controller 106. At step 218, the local controller 106 receives the personalized offer 107, determines the target fuel dispenser terminal 102, and sends the personalized offer 107 to the fuel dispenser terminal 102.

At step 220, the fuel dispenser terminal 102 displays the personalized offer 107 to the customer. The fuel dispenser terminal 102 may present one or more coupons 316, advertisements 318, and/or any other information that was sent by the remote controller 114 to the customer using a display of the user interface 108. For example, the fuel dispenser terminal 102 may present a coupon 316 for a product that is available at the first location 103 on a graphical user interface for the customer.

At step 222, the fuel dispenser terminal 102 receives a user response 112 in response to presenting the personalized offer 107 to the customer. The customer may interact the user interface 108 of the fuel dispenser terminal 102 to generate a user response 112 that indicates whether the customer accepts or declines a personalized offer 107 (e.g. a coupon 316). For example, the customer may interact with a touchscreen or button the fuel dispenser terminal 102 to indicate whether the customer accepts or declines a coupon 316 for a product that provided in the personalized offer 107. At step 224, the fuel dispenser terminal 102 sends the user response 112 to the remote controller 114 via the local controller 106. At step 226, the local controller 106 receives the user response 112 and sends the user response 112 to the remote controller 114.

At step 228, the remote controller 114 receives the user response 112 and determines whether the personalized offer 107 was accepted based on the user response 112. For example, the user response 112 may comprise one or more flag bits or values that are used to indicate whether the personalized offer 107 was accepted. The remote controller 114 proceeds to step 229 in response to determining that the personalized offer 107 was accepted.

At step 229, the remote controller 114 updates the service request 101 based on the user response 112. For example, the remote controller 114 updates the service request 101 by adding a purchase of a product corresponding with the coupon 112 to the fuel purchase in the original service request 101. Here, the remote controller 114 modifies the original service request 101 to include additional purchases before sending the service request 101 to the service processor 118. This process allows the network-enabled fuel dispensing system 100 to reduce the number of individual service requests 101 that are sent to the service processor 118. Reducing the number of service request 101 improves the operation of the system by reducing network traffic and improving bandwidth utilization. Returning to step 228, the remote controller 114 proceeds to step 230 in response to determining that the personalized offer 107 was not accepted.

At step 230, the remote controller 114 encrypts the service request 101. The remote controller 114 may encrypt the service request 101 using a process similar to the process described in step 204. For example, the remote controller 14 may apply the same public encryption key (e.g. an SSH public encryption key) that was used in step 204 to the service request 101 to re-encrypt the service request 101. At step 232, the remote controller 114 sends the encrypted service request 101 to the service processor 118 to request authorization for dispensing fuel.

At step 234, service processor 118 processes the service request 101. In one embodiment, the service processor 118 decrypts the encrypted service request 101 and authorizes a payment (e.g. a fuel purchase payment and/or a product purchase payment) based on the card information provided by the service request 101. The service processor 118 decrypt the encrypted service request 101 using a process similar to the process described in step 210. For example, the service processor 118 may apply the same private encryption key (e.g. an SSH private encryption key) that was used in step 210 to the encrypted service request 101 to decrypt the service request 101. At step 236, the service processor 118 sends an authorization confirmation 120 to the remote controller 114 in response to authorizing the payment. The authorization confirmation 120 indicates that the customer has been approved for the requested purchases based on their card information.

At step 238, the remote controller 114 receives the authorization confirmation 120 and generates an authorization token 122 in response to receiving the authorization confirmation 120. The authorization token 122 may be any suitable identifier that can be presented or used to retrieve the product or service corresponding with an accepted personalized offer 107. As an example, the remote controller 114 generates an alphanumeric code that represents the authorization token 122. As another example, the remote controller 114 generates a barcode that represents the authorization token 122. Examples of barcodes include, but are not limited to, Universal Product Codes (UPCs) and two-dimensional barcodes (e.g. quick response (QR) codes). At step 240, the remote controller 114 sends the authorization token 122 to the fuel dispenser terminal 102 via the local controller 106. At step 242, the local controller 106 receives the authorization token 122 and sends the authorization token 122 to the fuel dispenser terminal 102.

At step 244, the fuel dispenser terminal 102 receives the authorization token 122 and outputs the authorization token 122. For example, the fuel dispenser terminal 102 may output the authorization token 122 by printing a representation of the authorization token 122 onto a ticket. For instance, the fuel dispenser terminal 102 may print an alphanumeric code or barcode that represents the authorization token 122 onto a ticket. In this example, the customer can use the ticket to retrieve the accepted offer from a store 104 at the first location 103. As another example, the fuel dispenser terminal 102 may output the authorization token 122 by displaying the authorization token 122 to the customer on a display of the user interface 108.

As another example, the fuel dispenser terminal 102 may output the authorization token 122 by sending the authorization token 122 to a device located at the first location 103. For instance, the fuel dispenser terminal 102 may send the authorization token 122 to a point-of-sale (POS) device (e.g. a register) in a store 104 at the first location 103. In this example, the customer is able to go into the store 104 to retrieve their product without having to perform a transaction for the product within the store 104. As another example, the fuel dispenser terminal 102 may send the authorization token 122 to the customer's user device. In this example, the customer can present the authorization token 122 from user device to retrieve the accepted offer from the store 104. The fuel dispenser terminal 102 may send the authorization token 122 to one or more devices using short message service (SMS), nearfield communication (NFC), WiFi, Bluetooth communication, or any other suitable type of wired or wireless communication technique. In other examples, the fuel dispenser terminal 102 may output the authorization token 122 to the customer using any other suitable technique as would be appreciated by one of ordinary skill in the art.

At step 246, the fuel dispenser terminal 102 dispenses fuel to the customer in response to receiving the authorization token 122. For example, the user interface 108 sends control signals to the fuel dispensing system 110 to initiate and control the dispensing of fuel to the customer. At step 248, once the customer has finished receiving fuel, the fuel dispenser terminal 102 sends a service complete message 124 to the remote controller 114 via the local controller 106. The service complete message 124 may be any suitable type of message that indicates that the fuel dispenser terminal 102 has completed dispensing fuel to the customer. In one embodiment, the service complete message 124 comprises fuel purchase information that indicates a cost associated with an amount of fuel that is dispended to the customer from the fuel dispenser terminal 102. At step 250, the local controller 106 receives the service complete message 124 and sends the service complete message 124 to the remote controller 114. At step 252, the remote controller 114 receives the service complete message 124 and sends the service complete message 124 to the service processor 118.

At step 254, the service processor 118 finalizes the fuel service session for the customer. For example, the service processor 118 may process a payment using the customer's card information for the purchase of fuel and/or any other products.

Remote Controller Configuration

FIG. 3 is a schematic diagram of an embodiment of a remote controller 114 for the network-enabled fuel dispensing system 100. The remote controller 114 comprises a processor 302, a memory 304, and a network interface 306. The remote controller 114 may be configured as shown or in any other suitable configuration.

The processor 302 comprises one or more processors operably coupled to the memory 304. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the remote control engine 308. In this way, processor 302 may be a special purpose computer designed to implement function disclosed herein. In an embodiment, the remote control engine 308 are implemented using logic units, FPGAs, ASICs, DSPs, or any other suitable hardware. The remote control engine 308 is configured to perform the operations for the remote controller 114 described in FIGS. 1, 2A, and 2B.

The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise read-only memory (ROM), random-access memory (RAM), ternary content-addressable memory (TCAM), dynamic random-access memory (DRAM), and static random-access memory (SRAM).

The memory 304 is operable to store remote control instructions 310, configuration files 312, event logs 314, coupons 316, advertisements 318, inventory information 320, customer profiles 322, personal information 324, card information 326, transaction history 328, alternative identifiers 330, and/or any other data or instructions. The remote control instructions 310 may comprise any suitable set of instructions, logic, rules, or code operable to execute the remote control engine, respectively.

The configuration files 312 and the event files 314 are similar to the configuration files 312 and the event logs 314 described in FIG. 1, respectively. The coupons 316, advertisements 318, and inventory information 320 are configured similar to the coupons 316, the advertisements 318, and inventory information 320 described in FIGS. 2A and 2B, respectively.

The customer profiles 322 are similar to the customer profiles 322 described in FIGS. 1, 2A, and 2B. The personal information 324 may comprise demographic information, address information, account information, phone numbers, email addresses, or any other suitable type of information associated with a customer. The card information 326 may comprise a card number for a credit card, a debit card, a gift card, or any other suitable type of payment card. The transaction history 328 may comprise fuel purchase history, product purchase history, online purchase history, or any other suitable purchase history associated with a customer. The alternative identifiers 330 may comprise loyalty card identifiers, a phone number, an email address, or any other suitable type of identifiers associated with a customer.

The network interface 306 is configured to enable wired and/or wireless communications. The network interface 306 is configured to communicate data between the remote controller 114 and other devices (e.g. the fuel dispenser terminal 102, the local controller 106, and the service processor 118), systems, or domain. For example, the network interface 306 may comprise a WIFI interface, a local area network (LAN) interface, a wide area network (WAN) interface, a modem, a switch, or a router. The processor 302 is configured to send and receive data using the network interface 306. The network interface 306 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network-enabled fuel dispensing system, comprising:
   a fuel dispenser terminal located at a first location, comprising:
      a first hardware processor configured to:
         receive a payment card for a customer;
         obtain card information associated with the customer from the payment card;
         generate a service request comprising the card information associated with the customer, wherein the card information comprises an identity of the customer;
         encrypt the service request using a public encryption key;
         send the encrypted service request to a service processor via a remote controller thereby providing a secured communication for the service request;
         receive a personalized offer for the customer in response to sending the encrypted service request, wherein the personalized offer identifies a product that is available in a store at the first location;
         display at least a portion of the personalized offer;

in response to the customer accepting the personalized offer:
receive a first authorization token, wherein the first authorization token indicates, based at least on the identity of the customer extracted from the service request and inventory information for the first location, that the customer is authorized to retrieve the product from the store as well as receive a requested amount of fuel at the fuel dispensing terminal; and
output the first authorization token, wherein outputting the first authentication token comprises communicating the first authentication token to a device at the store such that the customer retrieves the product without performing an additional transaction for the product at the store; and
the remote controller located at a second location that is different from the first location, and comprising a second hardware processor configured to:
intercept the encrypted service request transmitted by the fuel dispenser terminal before the encrypted service request is transmitted to the service processor;
decrypt the encrypted service request using a private encryption key to identify the card information associated with the customer;
identify a customer profile for the customer based on the card information associated with the customer, wherein the customer profile comprises previous history for the customer;
obtain the inventory information for the first location identifying products currently available at the first location;
identify the product available at the first location based on the previous history for the customer and the inventory information, wherein the product matches a product previously obtained by the customer in the previous history for the customer and that is currently available at the first location in the inventory information;
generate the personalized offer identifying the product that was previously obtained by the customer and is available at the first location in response to receiving the service request;
send the personalized offer to the fuel dispenser terminal;
determine whether the customer accepts the personalized offer;
in response to determining that the customer accepts the personalized offer:
add the personalized offer to the service request, wherein by adding the personalized offer to the service request, a number of individual service requests is reduced such that the customer does not make an additional request for the product to the local controller;
send the first authorization token to the fuel dispenser terminal;
re-encrypt the service request updated with the personalized offer using the same public encryption key that was used by the fuel dispenser terminal; and
send the re-encrypted service request updated with the personalized offer to the service processor thereby providing a secured communication for the service request;
determine that the product is retrieved from the store using the first authentication token;
determine that the requested amount of fuel is dispensed at the fuel dispensing terminal using the first authentication token;
in response to determining that the customer does not accept the Personalized offer:
do not add the personalized offer to the service request;
send a second authentication token to the fuel dispensing terminal, wherein the second authentication token indicates that the customer is authorized to receive the requested amount of fuel at the fuel dispensing terminal;
re-encrypt the service request using the same public encryption key that was used by the fuel dispenser terminal;
send the re-encrypted service request to the service processor; and
determine that the requested amount of fuel is dispensed at the fuel dispensing terminal using the second authentication token.

2. The system of claim 1, further comprising a local controller located at the first location, wherein:
the local controller is in signal communication with the fuel dispenser terminal and the remote controller; and
the local controller is configured to communicate data between the fuel dispenser terminal and the remote controller.

3. The system of claim 1, wherein generating the personalized offer comprises selecting a coupon from a set of coupons for products available at the first location based on transaction history information for the customer.

4. The system of claim 3, wherein selecting the coupon comprises:
identifying a product previously purchased by the customer; and
selecting the coupon for the identified product.

5. The system of claim 3, wherein:
the remote controller is further configured to determine a timestamp for when the encrypted service request is received; and
selecting the coupon is based at least in part on the timestamp.

6. The system of claim 1, wherein:
generating the personalized offer comprises selecting an advertisement from a set of advertisements based on transaction history information for the customer.

7. The system of claim 1, wherein:
a first public encryption key is used to generate the encrypted service request; and
the first public encryption key is used to generate the re-encrypted service request.

8. An information control method, comprising:
receiving, by a fuel dispenser terminal located at a first location, a payment card for a customer;
obtaining, by the fuel dispenser terminal, card information associated with the customer from the payment card;
generating, by the fuel dispenser terminal, a service request comprising the card information associated with the customer, wherein the card information comprises an identity of the customer;
encrypting, by the fuel dispenser terminal, the service request using a public encryption key;
sending, by the fuel dispenser terminal, the encrypted service request to a service processor via a remote controller located at a second location thereby providing a secured communication for the service request, wherein the second location is different from the first location;

intercepting, by the remote controller, the service request transmitted by the fuel dispenser terminal before the service request is transmitted to the service processor;

decrypting, by the remote controller, the encrypted service request using a private encryption key to identify the card information associated with the customer;

identifying, by the remote controller, a customer profile for the customer based on the card information associated with the customer, wherein the customer profile comprises previous history for the customer;

obtaining, by the remote controller, inventory information for the first location identifying products currently available at the first location;

identifying, by the remote controller, a product available at the first location based on the previous history for the customer and the inventory information, wherein the product matches a product previously obtained by the customer in the previous history for the customer and that is currently available at the first location in the inventory information;

sending, by the remote controller, a personalized offer identifying the product that was previously obtained by the customer and is available at the first location to the fuel dispenser terminal;

determining, by the remote controller, whether the customer accepts the personalized offer;

in response to determining that the customer accepts the personalized offer:
  adding the personalized offer to the service request, wherein by adding the personalized offer to the service request, a number of individual service requests is reduced such that the customer does not make an additional request for the product to the local controller;
  sending, by the remote controller, a first authorization token to the fuel dispenser terminal, wherein the first authorization token indicates, based at least on the identity of the customer extracted from the service request and inventory information for the first location, that the customer is authorized to retrieve the product from the store as well as receive a requested amount of fuel at the fuel dispensing terminal;
  re-encrypting, by the remote controller, the service request updated with the personalized offer using the same public encryption key that was used by the fuel dispenser terminal;
  sending, by the remote controller, the re-encrypted service request to the service processor thereby providing a secured communication for the service request;
  receiving, by the fuel dispenser terminal, the personalized offer in response to sending the encrypted service request;
  displaying, by the fuel dispenser terminal, at least a portion of the personalized offer;
  receiving, by the fuel dispenser terminal, the first authorization token in response to the customer accepting the personalized offer; and
  outputting, by the fuel dispenser terminal, the first authorization token, wherein outputting the first authentication token comprises communicating the first authentication token to a device at the store such that the customer retrieves the product without performing an additional transaction for the product at the store;
  determining that the product is retrieved from the store using the first authentication token;
  determining that the requested amount of fuel is dispensed at the fuel dispensing terminal using the first authentication token;

in response to determining that the customer does not accept the personalized offer:
  excluding the personalized offer from the service request;
  sending a second authentication token to the fuel dispensing terminal, wherein the second authentication token indicates that the customer is authorized to receive the requested amount of fuel at the fuel dispensing terminal;
  re-encrypting the service request using the same public encryption key that was used by the fuel dispenser terminal;
  sending the re-encrypted service request to the service processor; and
  determining that the requested amount of fuel is dispensed at the fuel dispensing terminal using the second authentication token.

9. The method of claim 8, wherein selecting the personalized offer comprises selecting, by the remote controller, a coupon from a set of coupons for products available at the first location based on transaction history information for the customer.

10. The method of claim 9, wherein selecting the coupon comprises:
identifying a product previously purchased based on transaction history information for the customer; and
selecting the coupon for the identified product.

11. The method of claim 9, wherein selecting the coupon is based at least in part on a timestamp for when the encrypted service request is received.

12. The method of claim 8, wherein selecting the personalized offer comprises selecting, by the remote controller, an advertisement from a set of advertisements based on transaction history information for the customer.

13. The method of claim 8, further comprising:
receiving, by a local controller located at the first location, the encrypted service request from the fuel dispenser terminal; and
sending, by the local controller, the encrypted service request to the remote controller.

14. The method of claim 8, wherein:
a first public encryption key is used to generate the encrypted service request; and
the first public encryption key is used to generate the re-encrypted service request.

15. A device, comprising:
a network interface in signal communication with a fuel dispenser terminal at a first location, configured to receive an encrypted service request comprising card information associated with a customer from the fuel dispenser terminal, wherein the card information comprises an identity of the customer, wherein the service request is encrypted using a public encryption key by the fuel dispenser terminal thereby providing a secured communication for the service request; and
a processor operably coupled to the network interface, configured to:

intercept the service request transmitted by the fuel dispenser terminal before the service request is transmitted to a service processor decrypt the encrypted service request using a private encryption key to identify the card information associated with the customer;

identify a customer profile for the customer based on the card information associated with the customer, wherein the customer profile comprises previous history for the customer;

obtain inventory information for the first location identifying products currently available at the first location;

identify a product available at the first location based on the previous history for the customer and the inventory information, wherein the product matches a product previously obtained by the customer in the previous history and that is currently available at the first location in the inventory information;

send a personalized offer identifying the product that was previously obtained by the customer and is available at the first location to the fuel dispenser terminal;

output the first authorization token, wherein outputting the first authentication token comprises communicating the first authentication token to a device at the store such that the customer retrieves the product without performing an additional transaction for the product at the store;

determine whether the customer accepts the personalized offer;

in response to determining that the customer accepts the personalized offer:
add the personalized offer to the service request, wherein by adding the personalized offer to the service request, a number of individual service requests is reduced such that the customer does not make an additional request for the product to the local controller;

send a first authorization token to the fuel dispenser, wherein the first authorization token indicates, based at least on the identity of the customer extracted from the service request and the inventory information for the first location, that the customer is authorized to retrieve the product from the store as well as receive a requested amount of fuel at the fuel dispensing terminal;

re-encrypt the service request updated with the personalized offer using the same public encryption key that was used by the fuel dispenser terminal; and send the re-encrypted service request updated with the personalized offer to the service processor thereby providing a secured communication for the service request;

determine that the product is retrieved from the store using the first authentication token;

determine that the requested amount of fuel is dispensed at the fuel dispensing terminal using the first authentication token;

in response to determining that the customer does not accept the personalized offer:
do not add the personalized offer to the service request;

send a second authentication token to the fuel dispensing terminal, wherein the second authentication token indicates that the customer is authorized to receive the requested amount of fuel at the fuel dispensing terminal;

re-encrypt the service request using the same public encryption key that was used by the fuel dispenser terminal;

send the re-encrypted service request to the service processor; and determine that the requested amount of fuel is dispensed at the fuel dispensing terminal using the second authentication token.

16. The device of claim 15, wherein:
selecting the personalized offer comprises selecting a coupon from a set of coupons for products available at the first location based on transaction history information for the customer.

17. The device of claim 16, wherein selecting the coupon comprises:
identifying a product previously purchased based on transaction history information for the customer; and
selecting the coupon for the identified product.

18. The device of claim 15, wherein selecting the personalized offer is based at least in part on a timestamp for when the encrypted service is received.

19. The device of claim 15, wherein:
selecting the personalized offer comprises selecting an advertisement from a set of advertisements based on transaction history information for the customer.

20. The device of claim 15, wherein:
a first public encryption key is used to generate the encrypted service request; and
the first public encryption key is used to generate the re-encrypted service request.

* * * * *